(12) United States Patent
Peng et al.

(10) Patent No.: US 9,500,901 B2
(45) Date of Patent: Nov. 22, 2016

(54) LIQUID CRYSTAL DISPLAY AND MANUFACTURING METHOD THEREOF

(71) Applicant: Century Technology (Shenzhen) Corporation Limited, Shenzhen (CN)

(72) Inventors: Hai-Bo Peng, Shenzhen (CN); Chen-Fu Mai, New Taipei (TW)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 88 days.

(21) Appl. No.: 14/501,037

(22) Filed: Sep. 30, 2014

(65) Prior Publication Data
US 2015/0092141 A1  Apr. 2, 2015

(30) Foreign Application Priority Data

Sep. 30, 2013  (CN) .......................... 2013 1 0455822

(51) Int. Cl.
| | |
|---|---|
| *G02F 1/13* | (2006.01) |
| *G02F 1/1335* | (2006.01) |
| *B32B 37/12* | (2006.01) |
| *B32B 37/30* | (2006.01) |
| *G02B 5/30* | (2006.01) |
| *B32B 37/18* | (2006.01) |
| *B32B 38/00* | (2006.01) |
| *G02F 1/1333* | (2006.01) |

(52) U.S. Cl.
CPC ......... *G02F 1/133528* (2013.01); *B32B 37/12* (2013.01); *B32B 37/30* (2013.01); *G02B 5/30* (2013.01); *B32B 37/18* (2013.01); *B32B 38/004* (2013.01); *B32B 2305/55* (2013.01); *B32B 2307/42* (2013.01); *B32B 2309/02* (2013.01); *B32B 2309/04* (2013.01); *B32B 2309/12* (2013.01); *B32B 2457/202* (2013.01); *G02F 1/1303* (2013.01); *G02F 2001/133331* (2013.01); *G02F 2001/133531* (2013.01); *G02F 2001/133538* (2013.01); *G02F 2202/28* (2013.01); *Y10T 156/10* (2015.01)

(58) Field of Classification Search
CPC .............................. G02F 2001/133531; G02F 2001/133538; G02F 1/133358
See application file for complete search history.

(56) References Cited

U.S. PATENT DOCUMENTS

2013/0135564 A1* 5/2013 Miyazaki .......... G02F 1/133528
349/96

FOREIGN PATENT DOCUMENTS

| JP | 2005115056 A | * | 4/2005 |
| JP | 2011107391 A | * | 6/2011 |

* cited by examiner

*Primary Examiner* — Mariceli Santiago
(74) *Attorney, Agent, or Firm* — Zhigang Ma

(57) ABSTRACT

A liquid crystal display includes a first polarizer and a liquid crystal display panel adhered to the first polarizer. The first polarizer includes a first sub-areas and a first center area. An adhesion intensity of the first polarizer and the liquid crystal cell corresponding to the first sub-area is greater than an adhesion intensity of the first polarizer and the liquid crystal cell corresponding to the first center area.

19 Claims, 19 Drawing Sheets

LIQUID CRYSTAL DISPLAY AND MANUFACTURING METHOD THEREOF

FIELD

The subject matter herein generally relates to a liquid crystal display and a method of manufacturing the liquid crystal display.

BACKGROUND

A basic liquid crystal display usually includes a liquid crystal cell with two crossed linear polarizer films. An attachment element is generally used to bind the polarizer film to the liquid crystal cell. Upon the completion of a confidence test, such as a high temperature process or/and a high humidity process, which is often applied to the liquid crystal display, the shrinkage of the polarizer due to the mismatch of thermo-mechanical properties results in light-leakage phenomena or shrink mura.

BRIEF DESCRIPTION OF THE DRAWINGS

Implementations of the present technology will now be described, by way of example only, with reference to the attached figures.

DETAILED DESCRIPTION

Figure 1:
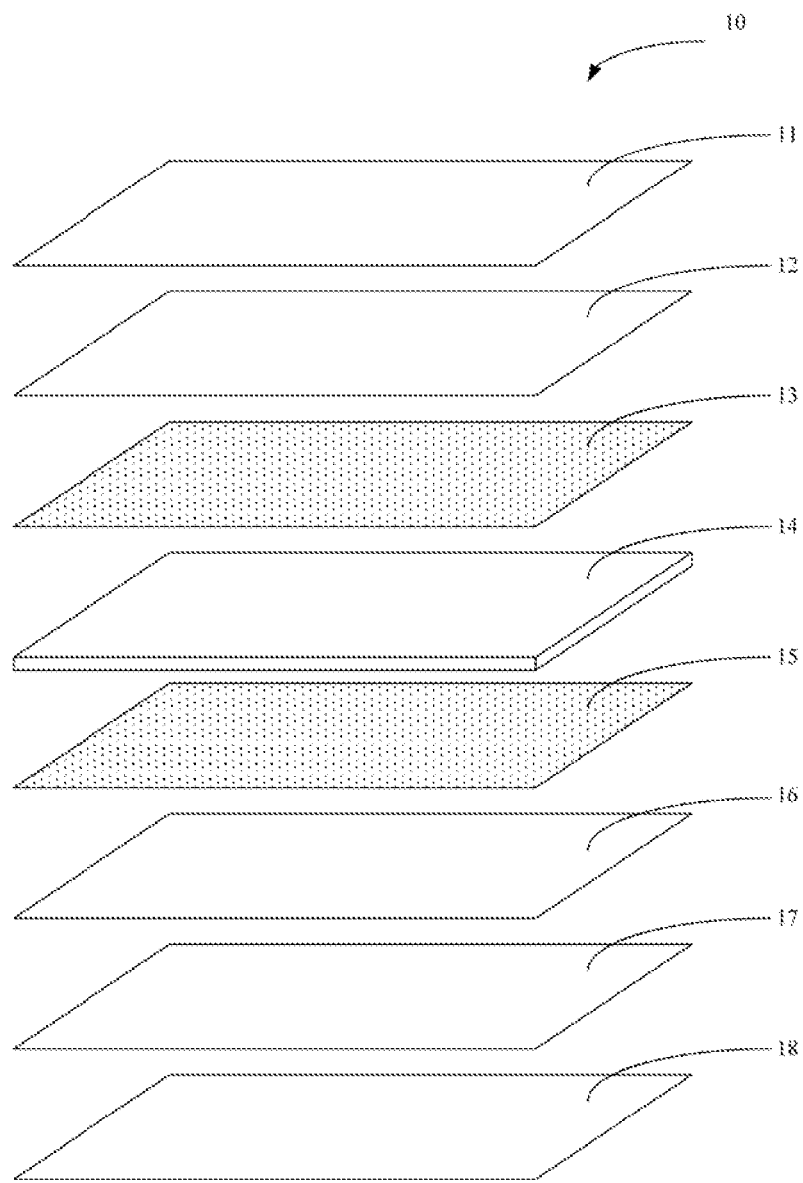
FIG. 1 is an exploded, isometric view of a liquid crystal display, the liquid crystal display including a first polarizer, first adhesive layer, a second polarizer, and a second adhesive layer.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

An emitting direction of light beams and an absorption axis of the polarizer films are determined whether the light is able to emit out. In detail, a light paralleled to the absorption axis is absorbed by the polarizer, and a light perpendicular to the absorption axis passes through the polarizer. Upon the completion of the confidence test, a shrinkage stress is generated and applied to the polarizer along directions from edges of the polarizer towards a geometric center of the polarizer.

It is understood that, in some areas of the polarizer, a direction of the absorption axis is paralleled to the direction of the shrinkage stress. In some areas of the polarizer, the direction of the absorption axis is perpendicular to the direction of the shrinkage stress. In some other areas of the polarizer, the direction of the absorption axis is skewed to the direction of the shrinkage stress. A main cause of the light leakage situation is that the absorption axis occur an offset due to the change of shrinkage force after a confidence test. At the center area of the polarizer, the absorption axis of the polarizer has a little, even no offset, but in a peripheral area adjacent to the edges of the polarizer has a greater offset than the center area. Furthermore, at the peripheral area, the polarizer is also applied with different shrinkage stresses, and therefore results in different offsets. As a specific performance, the absorption axis has a great offset when the direction of the absorption axis is skewed to the direction of the shrinkage stress, and the absorption axis has a little offset when the direction of the absorption axis is parallel or perpendicular to the direction of the shrinkage stress. That is, the direction of the absorption axis is skewed to the direction of the shrinkage stress in the peripheral area is defined a great offset area. In the embodiments of the disclosure, the attachment strength between the polarizer and the liquid crystal cell opposite to the great offset area is increased to improve the light leakage situation.

FIG. 1 is an exploded, isometric view of a liquid crystal display. Referring to FIG. 1, the liquid crystal display 10 includes a cover glass 11, a first polarizer 12, a first adhesive layer 13, a liquid crystal cell 14, a second adhesive layer 15, a second polarizer 16, an optical adjustment element 17, and a backlight module 18.

The cover glass 11 covers and protects the first polarizer 12. The first polarizer 12 allows light to pass through in a direction. The second polarizer 16 allows light to pass through in another direction which is perpendicular to the above direction. The backlight module 18 provides light to the liquid crystal display panel 14. The optical adjustment element 17 adjusts the light emitted from the backlight module 18.

Figure 2:
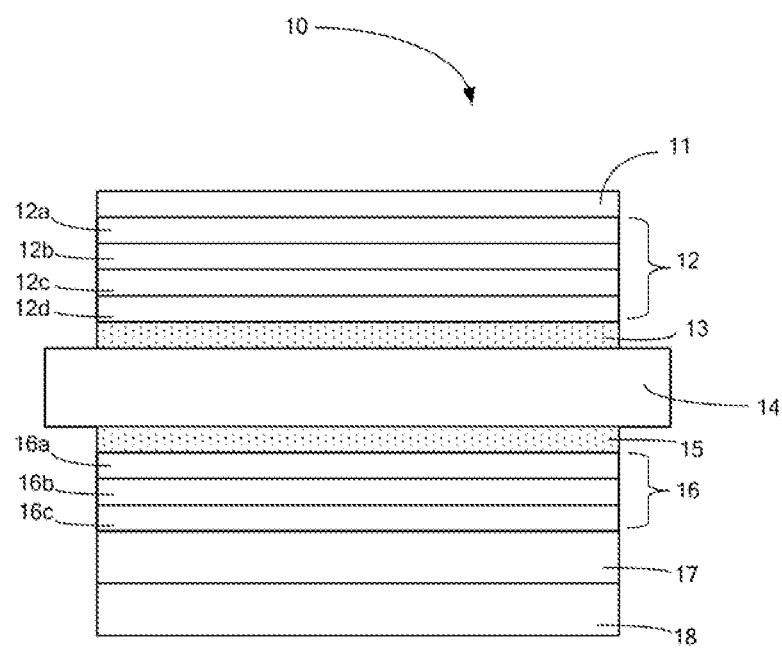
FIG. 2 is a cross-sectional view of the liquid crystal display of FIG. 1.

Referring to FIG. 2, the first polarizer 12 is adhered with one side of the liquid crystal cell 14 via the first adhesive layer 13. The second polarizer 16 is adhered with another side of the liquid crystal cell 14 via the second adhesive layer 15. The cover glass 11 is disposed on one side of the first polarizer 12 away from the liquid crystal display panel 14. The backlight module 18 is disposed on one side of the second polarizer 16 away from the liquid crystal display panel 14. The optical adjustment element 17 is disposed between the second polarizer 16 and the backlight module 18.

In this embodiment, the cover glass 11 is made of polymethylmethacrylate (PMMA). The first polarizer 12 includes a top protection layer 12a, a polarizer layer 12b, a bottom protection layer 12c, and an optical compensation film 12d. The top protection layer 12a and the bottom protection layer 12c are made of triacetyl cellulose (TAC). The polarizer layer 12b is made of polyvinyl alcohol (PVA). The optical compensation film 12d is a wide-viewing film. The second polarizer 16 includes a top protection layer 16a, a polarizer layer 16b, a bottom protection layer 16c, and an optical compensation film 16d. The top protection layer 16a and the bottom protection layer 16c are made of triacetyl cellulose (TAC). The polarizer layer 16b is made of polyvinyl alcohol (PVA). The optical compensation film 16d is a wide-viewing film. The first adhesive layer 13 and the second adhesive layer 15 include a number of colloidal particles. In this embodiment, the colloidal particles are pressure sensitive particles.

Figure 3:
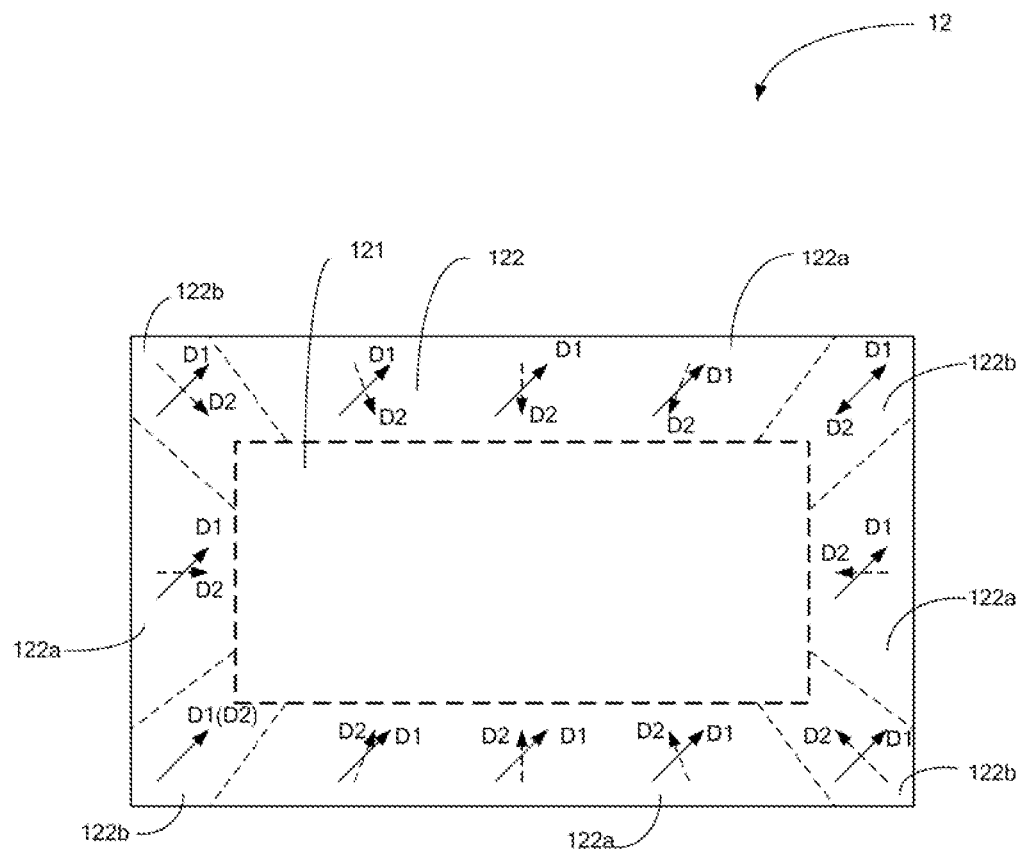
FIG. 3 is a top view of the first polarizer of FIG. 1, each area of the first polarizer including a first direction and a second direction.

Referring to FIG. 3, in this embodiment, the first polarizer 12 defines a first direction D1 and a second direction D2. The first direction D1 is a direction of the absorption axis of the first polarizer 12. The second direction D2 is a direction towards to the geometric center of the first polarizer 12. The first polarizer 12 includes a first center area 121 and a first peripheral area 122 adjacent to the edges of the first polarizer 12 and surrounding the first center area 121. The first peripheral area 122 includes several first sub-areas 122a and several second sub-areas 122b. Areas of the first peripheral area 122 where the first direction D1 is titled with the second direction D2 are defined as the first sub-areas 122a. Areas of the first peripheral area 122 where the first direction D1 is parallel or substantially perpendicular to the second direction D2 are defined as the second sub-area 122b. In this embodiment, the acreage of the first center area 121 is equal to the acreage of the first peripheral area 122. In the embodiment, the first peripheral area 122 is a rectangular ring shape. Each of the second sub-areas 122b is shaped as a wide-tape, with two ends of the tape connecting between a vertical angle of inner ring and a corresponding vertical angle of outer ring. The first sub-areas 122a are defined between the two adjacent second sub-areas 122b.

Figure 4:
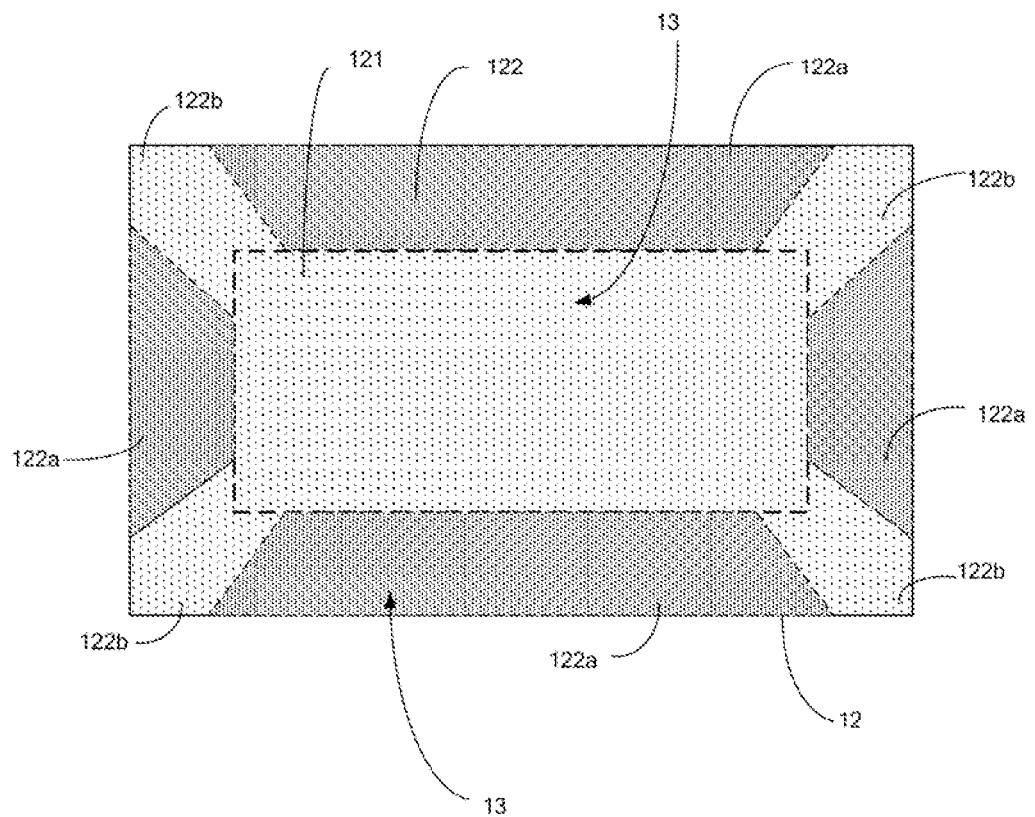
FIG. 4 is a top view of the first adhesive layer of FIG. 1.

Referring to FIG. 4, the first adhesive layer 13 is coated on a whole contact surface between the first polarizer 12 and the liquid crystal cell 14, and a distribution of the colloidal particles of the first adhesive layer 13 corresponding to the first sub-areas 122a is greater than a distribution of the colloidal particles of the first adhesive layer 13 corresponding to the second sub-areas 122b and the first center area 121. Thus, an adhesion intensity of the first polarizer 12 and the liquid crystal cell 14 corresponding to the first sub-areas 122a is greater than an adhesion intensity of the first polarizer 12 and the liquid crystal cell 14 corresponding to the second sub-areas 122b and the first center area 121.

Figure 5:
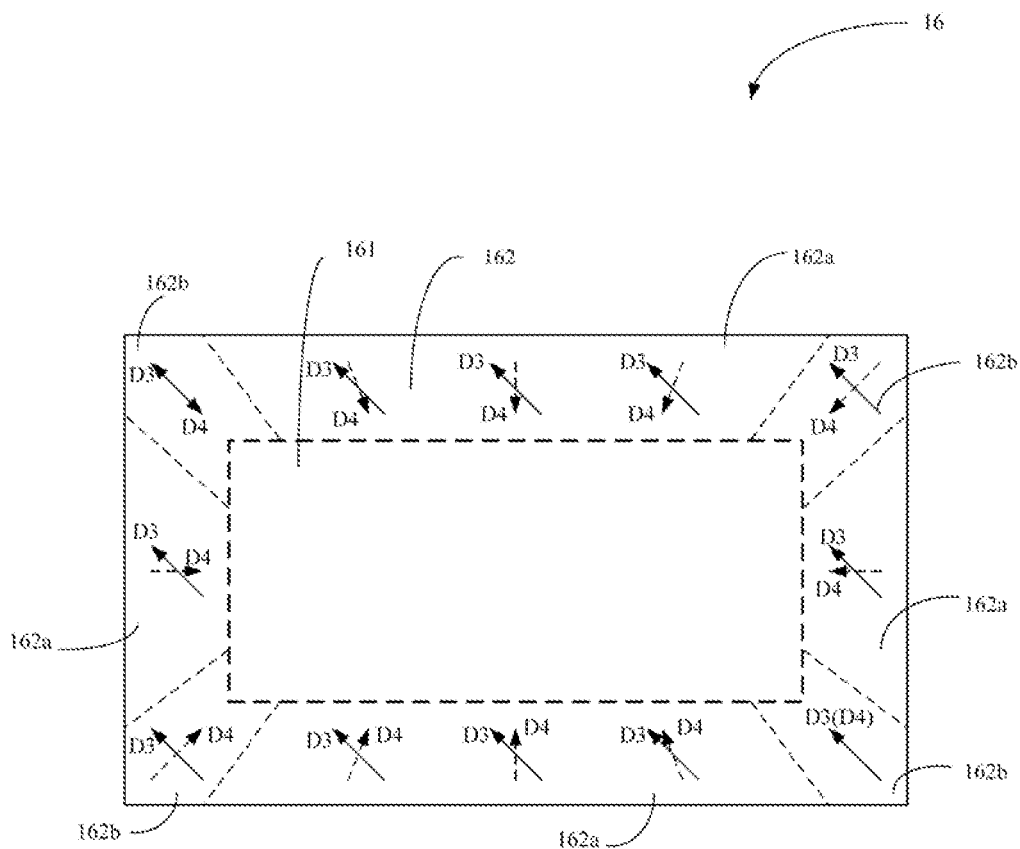
FIG. 5 is a top view of the second polarizer of FIG. 1, each area of the second polarizer including a third direction and a fourth direction.

Referring to FIG. 5, in the same way, the second polarizer 16 defines a third direction D3 and a fourth direction D4. The third direction D3 is a direction of the absorption axis of the second polarizer 16, the fourth direction D4 is a direction towards to the geometric center of the second polarizer 16. The second polarizer 16 includes a second center area 161 and a second peripheral area 162 adjacent to the edges of the second polarizer 16 and surrounding the second center area 161. The second peripheral area 162 includes several third sub-areas 162a and several fourth sub-areas 162b. Areas of the second peripheral area 162 where the third direction D3 is titled with the fourth direction D4 are defined as the third sub-areas 162a. Areas of the second peripheral area 162 where the third direction D3 is parallel or substantially perpendicular to the fourth direction D4 are defined as the fourth sub-area 162b. In this embodiment, the acreage of the second center area 161 is equal to the acreage of the second peripheral area 162. In the embodiment, the second peripheral area 162 is a rectangular ring shape. Each of the fourth sub-areas 162b is shaped as a wide-tape, with two ends of the tape connecting between a vertical angle of inner ring and a corresponding vertical angle of outer ring. The third sub-areas 162a are defined between the two adjacent fourth sub-areas 162b.

Figure 6:
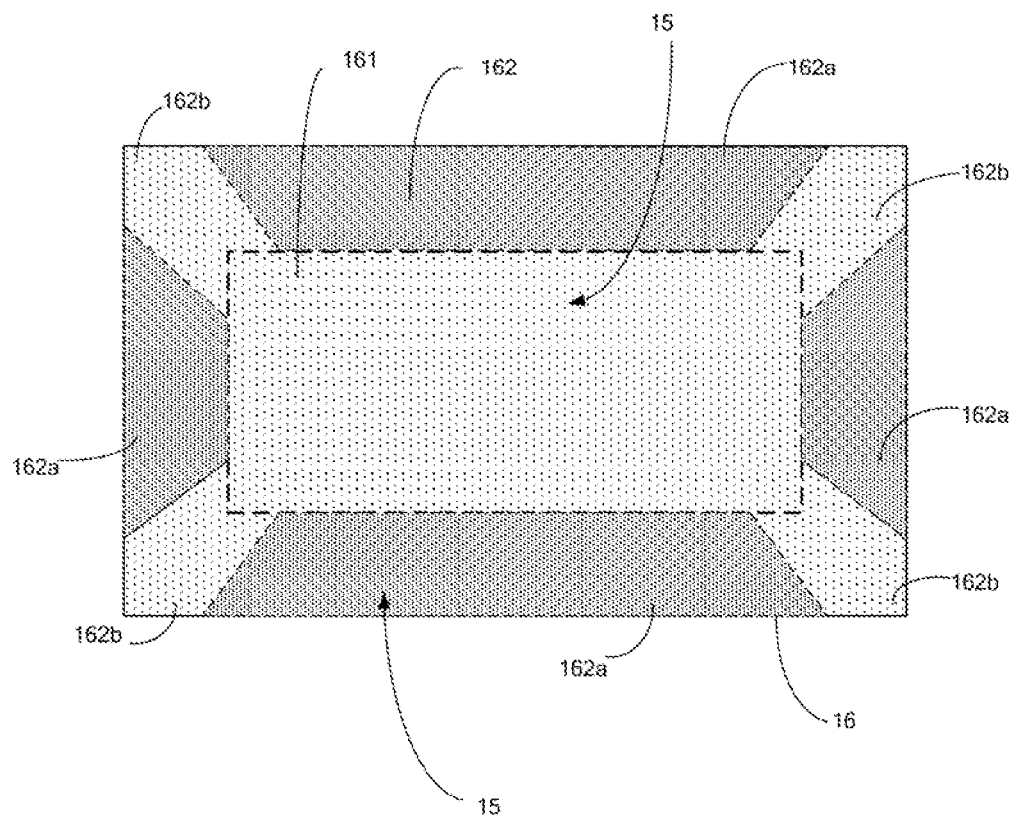
FIG. 6 is a top view of the second adhesive layer of FIG. 1.

Referring to FIG. 6, the second adhesive layer 15 is coated on a whole contact surface between the second polarizer 16 and the liquid crystal cell 14, and a distribution of the colloidal particles of the second adhesive layer 15 corresponding to the third sub-areas 162a is greater than a distribution of the colloidal particles of the second adhesive layer 15 corresponding to the fourth sub-areas 162b and the second center area 161. Thus, an adhesion intensity of the second polarizer 16 and the liquid crystal cell 14 corresponding to the third sub-areas 162a is greater than an adhesion intensity of the second polarizer 16 and the liquid crystal cell 14 corresponding to the fourth sub-areas 162b and the second center area 161.

Figure 7:
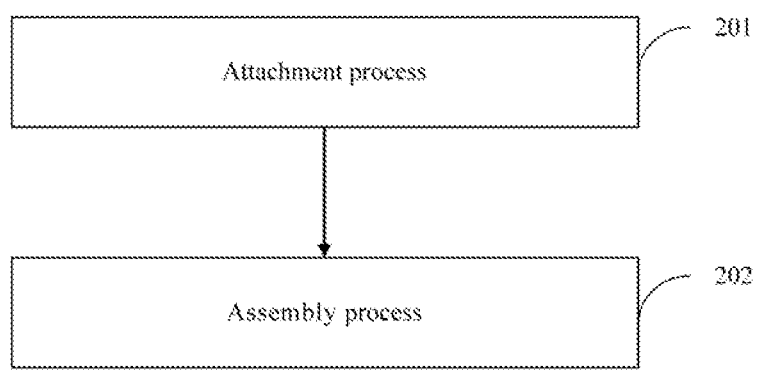
FIG. 7 is a flowchart of a method of manufacturing the liquid crystal display of FIG. 1.
Figure 8:
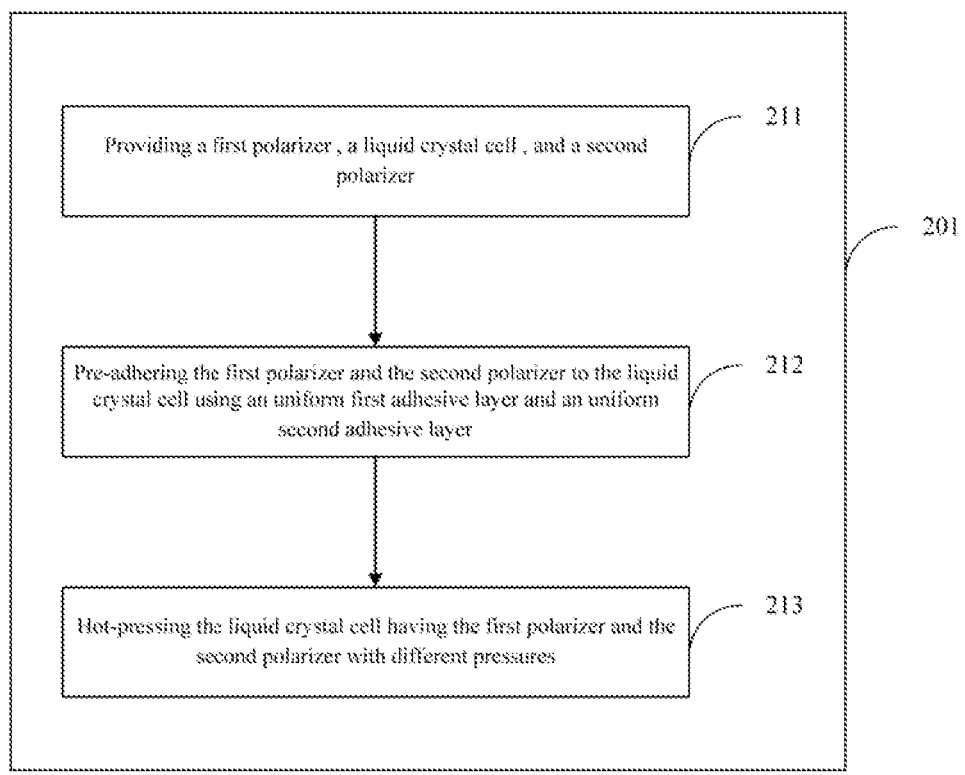
FIG. 8 is a sub-flowchart of a first embodiment of an attachment process of the method of FIG. 7.

FIG. 7 is a total flowchart of manufacturing the liquid crystal display 10. FIG. 8 is a sub-flowchart of a first embodiment of an attachment process of the method of FIG. 7. Depending on the embodiment, additional steps may be added, others deleted, and the ordering of the steps may be changed.

Figure 9:
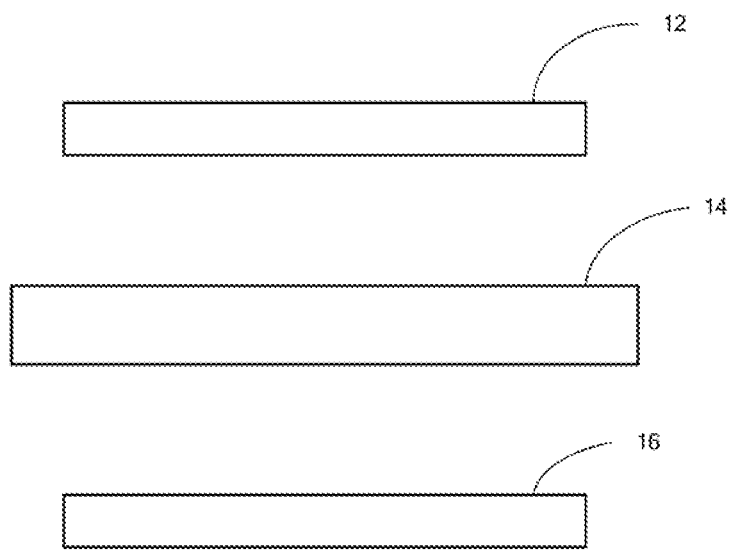
FIGS. 9-13 are diagrammatic views of successive steps of the manufacturing method of FIGS. 7-8.

In block 201, an attachment process is provided. In detail, referring to FIG. 9, in sub-block 211, a first polarizer 12, a liquid crystal cell 14, and a second polarizer 16 are provided.

Figure 10:
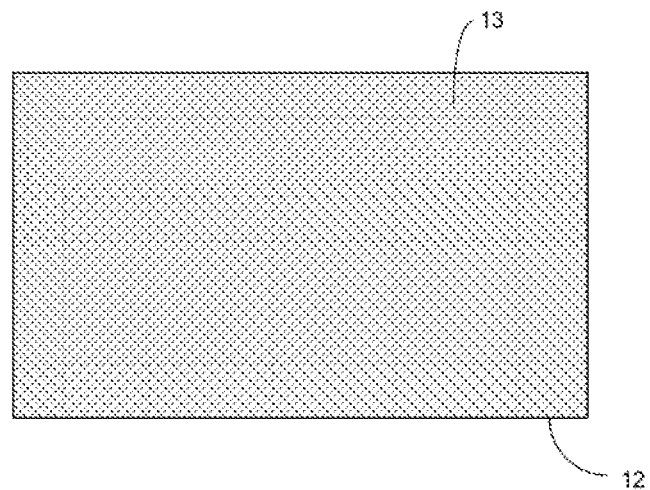
Figure 10:
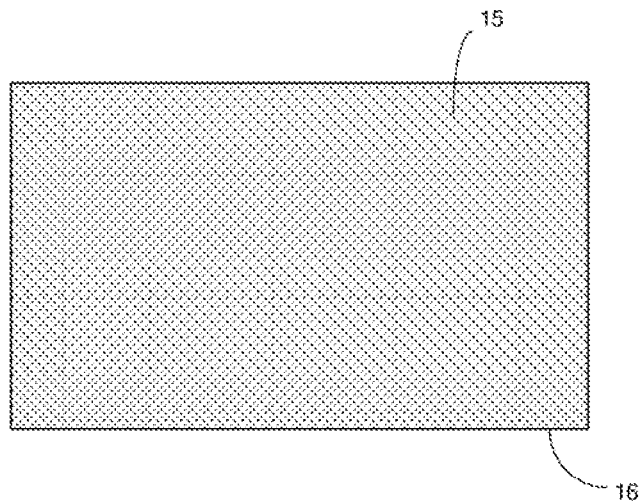
Figure 11:
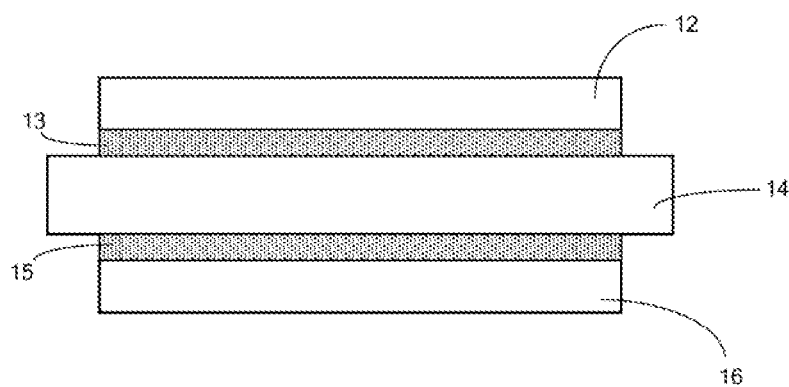

In sub-block 212, the first polarizer 12 and the second polarizer 16 are pre-adhered to the liquid crystal cell 14. In detail, referring to FIG. 10, a first adhesive layer 13 is formed on the first polarizer 12, and a second adhesive layer 15 is formed on the second polarizer 16. The first polarizer 12 is pre-adhered to the liquid crystal cell 14 using the first adhesive layer 13. The second polarizer 16 is pre-adhered to the liquid crystal cell 14 using the second adhesive layer 15. Referring to FIG. 11, the first adhesive layer 13 is distributed between the first polarizer 12 and the liquid crystal cell 14 uniformly. The second adhesive layer 15 is distributed between the second polarizer 16 and the liquid crystal cell 14 uniformly.

The first polarizer 12 defines a first direction D1 and a second direction D2. The second polarizer 16 defines a third direction D3 and a fourth direction D4. The first polarizer 12 includes a first center area 121 and a first peripheral area 122 adjacent to the edges of the first polarizer 12 and surrounding the first center area 121. The first peripheral area 122 includes several first sub-areas 122a and several second sub-areas 122b. Areas of the first peripheral area 122 where the first direction D1 is titled with the second direction D2 are defined as the first sub-areas 122a. Areas of the first peripheral area 122 where the first direction D1 is parallel or substantially perpendicular to the second direction D2 are defined as the second sub-area 122b. The second polarizer 16 includes a second center area 161 and a second peripheral area 162 adjacent to the edges of the second polarizer 16 and surrounding the second center area 161. The second peripheral area 162 includes several third sub-areas 162a and several fourth sub-areas 162b. Areas of the second peripheral area 162 where the third direction D3 is titled with the fourth direction D4 are defined as the third sub-areas 162a. Areas of the second peripheral area 162 where the third direction D3 is parallel or substantially perpendicular to the fourth direction D4 are defined as the fourth sub-area 162b.

Figure 12:
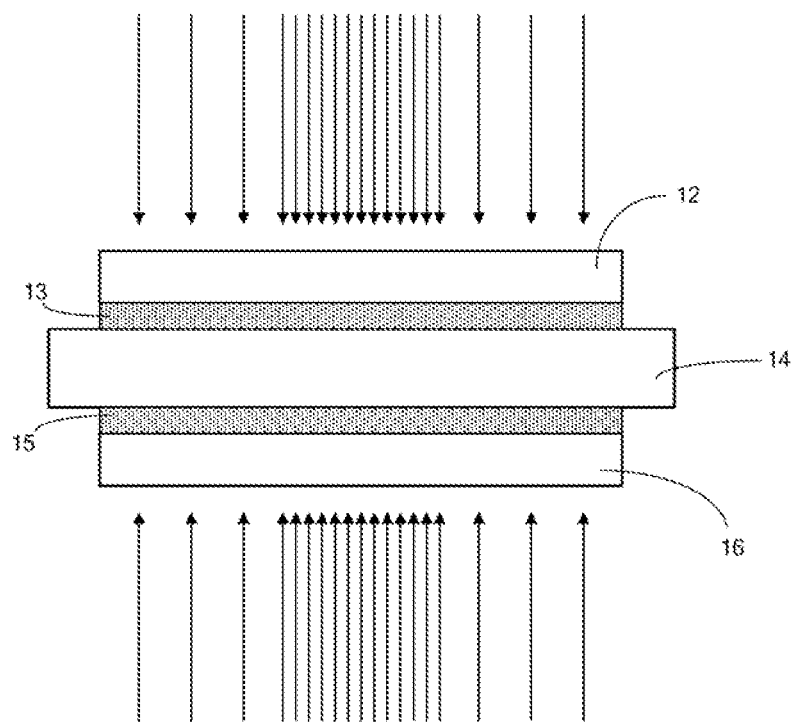

In sub-block 213, referring to FIG. 12, the liquid crystal cell 14 is hot-pressed having the first polarizer 12 and the second polarizer 16.

In detail, a pressure applied to the first sub-area 122a is less than a pressure applied to both the second sub-area 122b and the first center area 121. A pressure applied to the third sub-area 162a is less than a pressure applied to both the fourth sub-area 162b and the second center area 161.

During the hot pressing process, the first adhesive layer 13 and the second adhesive layer 15 are in a fluid state, so the first adhesive layer 13 and the second adhesive layer 15 are capable of flowing from an area applied with a higher pressure to an area applied with a lower pressure. Therefore, a distribution of the colloidal particles of the first adhesive layer 13 corresponding to the first sub-areas 122a is greater than a distribution of the colloidal particles of the first adhesive layer 13 corresponding to the second sub-areas 122b and the first center area 121. Thus, an adhesion intensity of the first polarizer 12 and the liquid crystal cell 14 corresponding to the first sub-areas 122a is greater than an adhesion intensity of the first polarizer 12 and the liquid crystal cell 14 corresponding to the second sub-areas 122b and the first center area 121. In the same way, a distribution of the colloidal particles of the second adhesive layer 15 corresponding to the third sub-areas 162a is greater than a distribution of the colloidal particles of the second adhesive layer 15 corresponding to the fourth sub-areas 162b and the second center area 161. Thus, an adhesion intensity of the second polarizer 16 and the liquid crystal cell 14 corresponding to the third sub-areas 162a is greater than an adhesion intensity of the second polarizer 16 and the liquid crystal cell 14 corresponding to the fourth sub-areas 162b and the second center area 161.

In this embodiment, the operation temperature of the hot-pressing process maintains 50 degree centigrade, and the duration of the autoclave process is about 30 minutes. The pressure applied to the first sub-area 122a and the third sub-area 162a is less than two atmospheres. The pressures applied to the second sub-area 122b, the first center area 121, the fourth sub-area 162b, and the second center area 161 are greater than two atmospheres.

Figure 13:
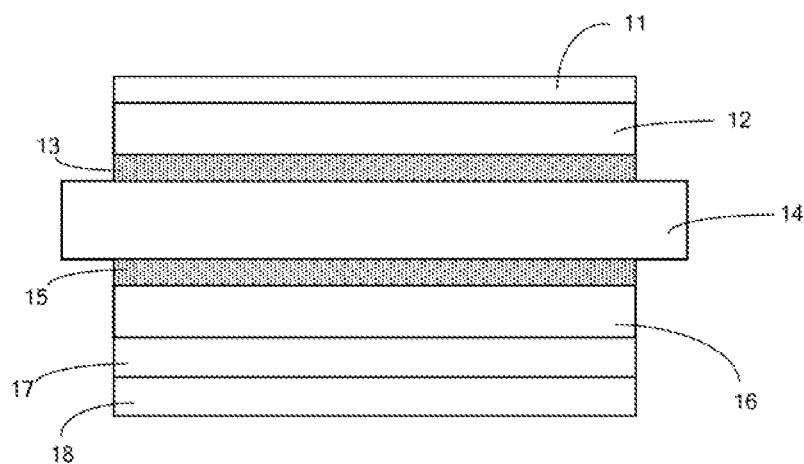

In block 202, referring to FIG. 13, a cover glass 11, an optical adjustment element 17, and a backlight module 18 are provided. The cover glass 11, the first polarizer 12, the adhesive layer 13, the liquid crystal display panel 14, the second adhesive layer 15, the second polarizer 16, the optical adjustment element 17 and the backlight module 18 are assembled to form a liquid crystal display 10. The present liquid crystal display 10 is thus obtained.

Figure 14:
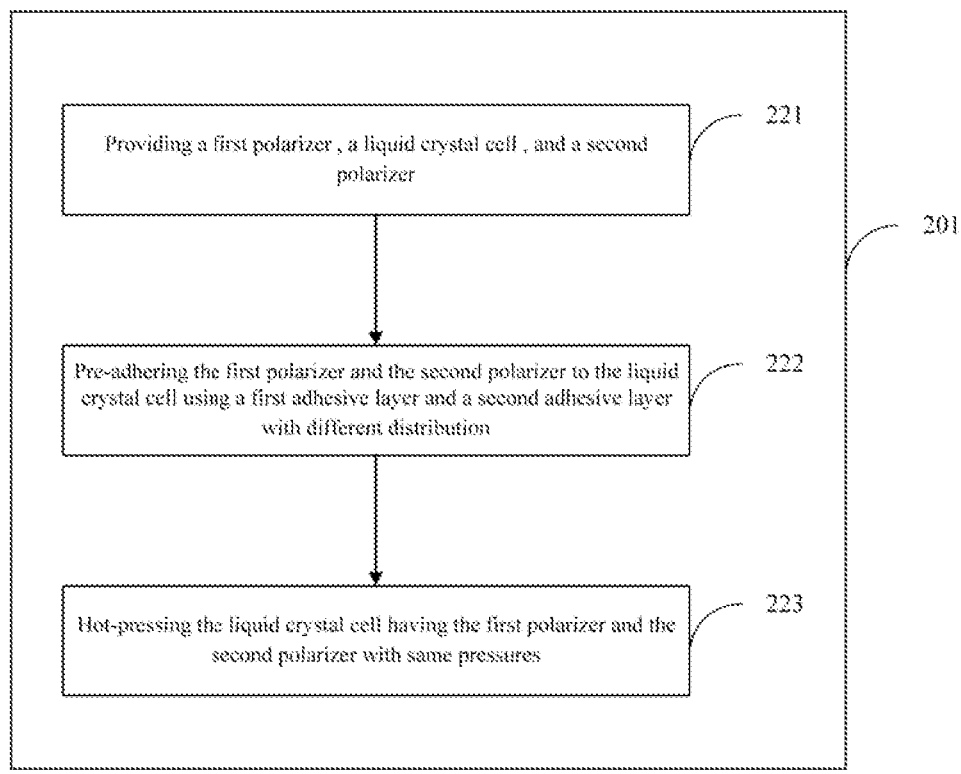
FIG. 14 is a sub-flowchart of a second embodiment of an attachment process of the method of FIG. 7.

FIG. 14 is a sub-flowchart of a second embodiment of an attachment process of the method of FIG. 7. Depending on the embodiment, additional steps may be added, others deleted, and the ordering of the steps may be changed.

Figure 15:
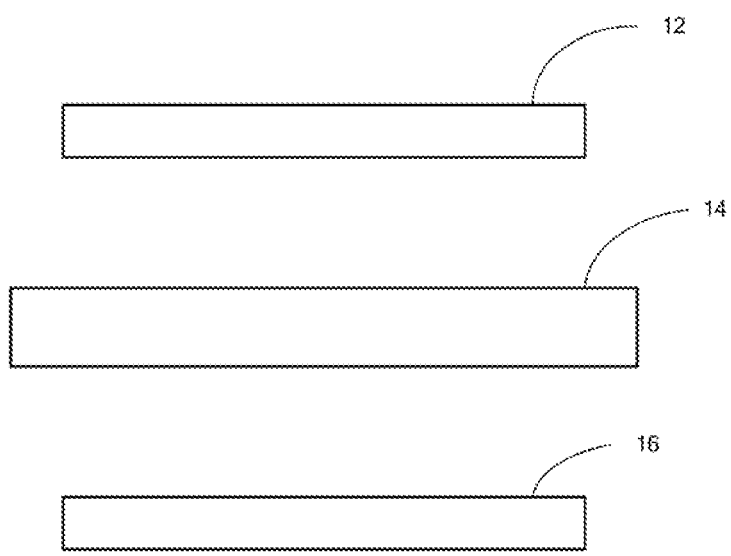
FIGS. 15-19 are diagrammatic views of successive steps of the manufacturing method of FIG. 7 and FIG. 13.

In block 201, an attachment process is provided. In detail, referring to FIG. 15, in sub-block 221, a first polarizer 12, a liquid crystal cell 14, and a second polarizer 16 are provided.

Figure 16:
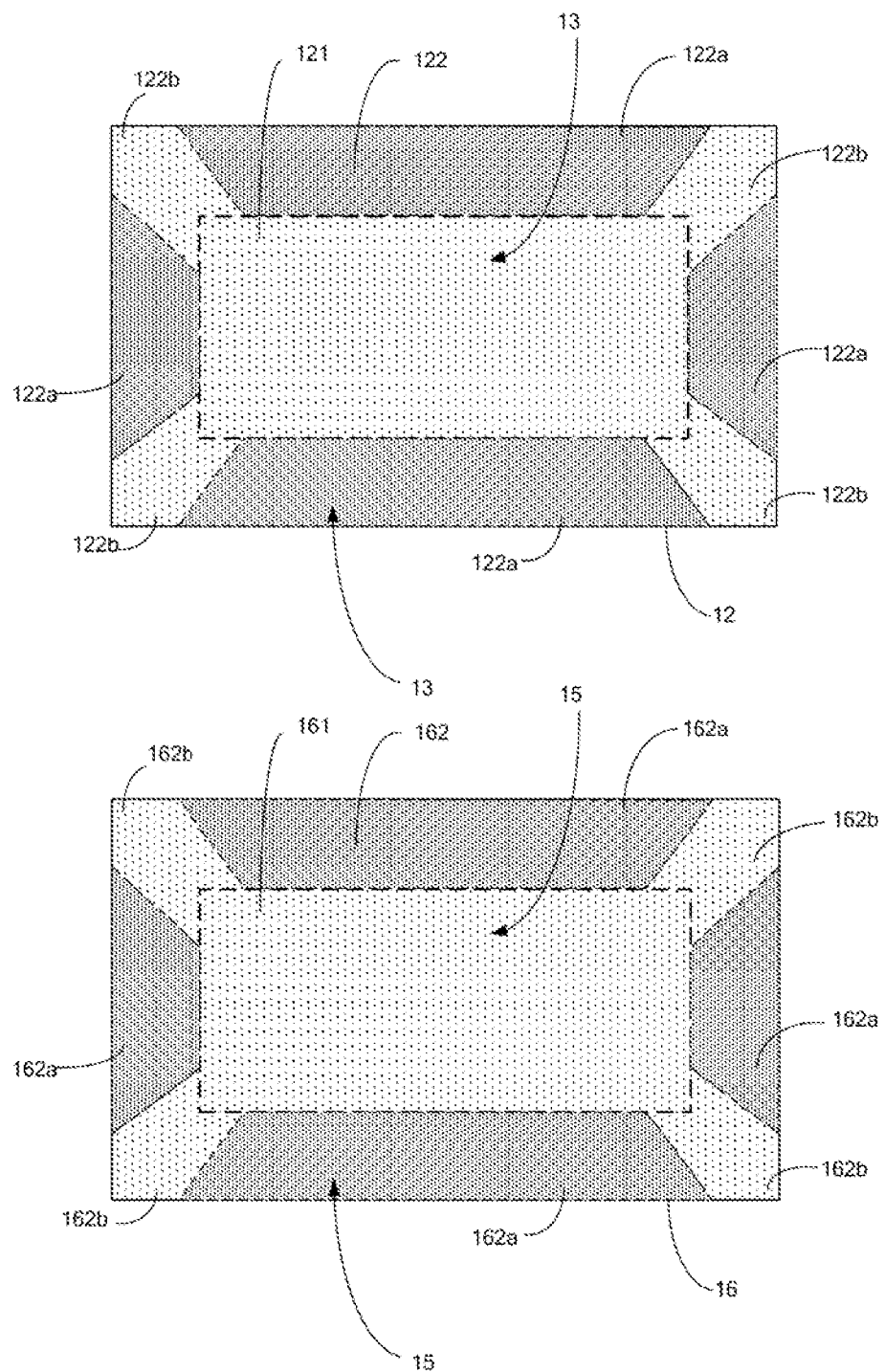
Figure 17:
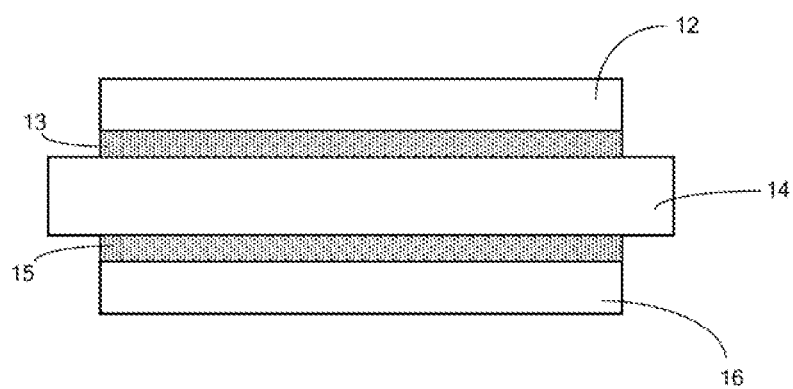

In sub-block 222, the first polarizer 12 and the second polarizer 16 are pre-adhered to the liquid crystal cell 14. In detail, referring to FIG. 16, a first adhesive layer 13 is formed on the first polarizer 12, and a second adhesive layer 15 is formed on the second polarizer 16. The first polarizer 12 is pre-adhered to the liquid crystal cell 14 using the first adhesive layer 13. The second polarizer 16 is pre-adhered to the liquid crystal cell 14 using the second adhesive layer 15. The first polarizer 12 defines a first direction D1 and a second direction D2. The second polarizer 16 defines a third direction D3 and a fourth direction D4. The first polarizer 12 includes a first center area 121 and a first peripheral area 122 adjacent to the edges of the first polarizer 12 and surrounding the first center area 121. The first peripheral area 122 includes several first sub-areas 122a and several second sub-areas 122b. Areas of the first peripheral area 122 where the first direction D1 is titled with the second direction D2 are defined as the first sub-areas 122a. Areas of the first peripheral area 122 where the first direction D1 is parallel or substantially perpendicular to the second direction D2 are defined as the second sub-area 122b. The second polarizer 16 includes a second center area 161 and a second peripheral area 162 adjacent to the edges of the second polarizer 16 and surrounding the second center area 161. The second peripheral area 162 includes several third sub-areas 162a and several fourth sub-areas 162b. Areas of the second peripheral area 162 where the third direction D3 is titled with the fourth direction D4 are defined as the third sub-areas 162a. Areas of the second peripheral area 162 where the third direction D3 is parallel or substantially perpendicular to the fourth direction D4 are defined as the fourth sub-area 162b. A distribution of the colloidal particles of the first adhesive layer 13 corresponding to the first sub-areas 122a is greater than a distribution of the colloidal particles of the first adhesive layer 13 corresponding to the second sub-areas 122b and the first center area 121. A distribution of the colloidal particles of the second adhesive layer 15 corresponding to the third sub-areas 162a is greater than a distribution of the colloidal particles of the second adhesive layer 15 corresponding to the fourth sub-areas 162b and the second center area 161. Referring to FIG. 17, the first adhesive layer 13 is distributed between the first polarizer 12 and the liquid crystal cell 14. The second adhesive layer 15 is distributed between the second polarizer 16 and the liquid crystal cell 14.

Figure 18:
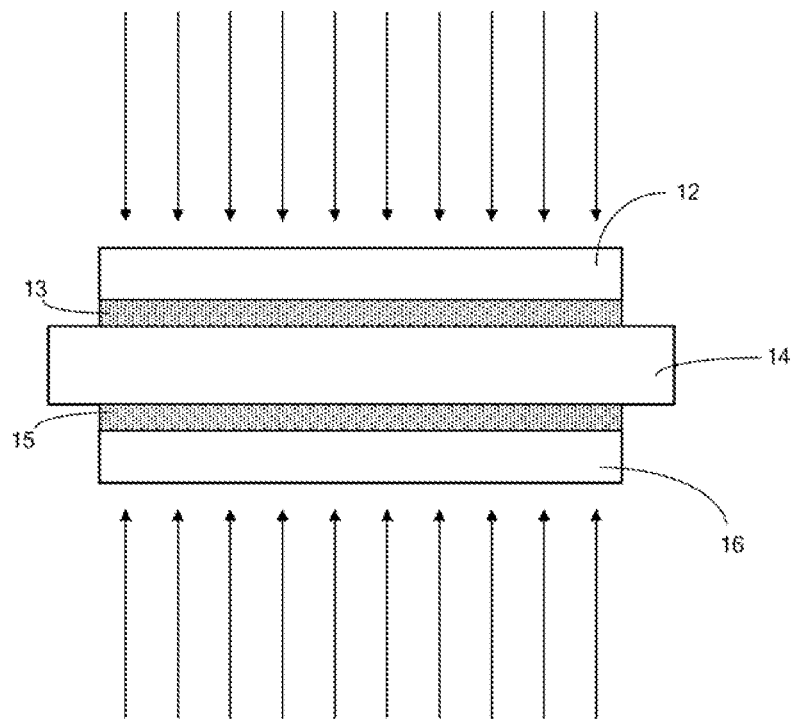

In sub-block 223, referring to FIG. 18, the liquid crystal cell 14 is hot-pressed having the first polarizer 12 and the second polarizer 16. In detail, a pressure applied to the first sub-area 122a, the second sub-area 122b and the first center area 121 are the same. A pressure applied to the third sub-area 162a, the fourth sub-area 162b and the second center area 161 are the same. Thus, an adhesion intensity of the first polarizer 12 and the liquid crystal cell 14 corresponding to the first sub-areas 122a is greater than an adhesion intensity of the first polarizer 12 and the liquid crystal cell 14 corresponding to the second sub-areas 122b and the first center area 121. An adhesion intensity of the second polarizer 16 and the liquid crystal cell 14 corresponding to the third sub-areas 162a is greater than an adhesion intensity of the second polarizer 16 and the liquid crystal cell 14 corresponding to the fourth sub-areas 162b and the second center area 161.

In this embodiment, the operation temperature of the hot-pressing process maintains 50 degree centigrade, and the duration of the autoclave process is about 30 minutes. The pressure applied to the first sub-area 122a, the second sub-area 122b, the third sub-area 162a, the fourth sub-area 162b, the first center area 121, and the second center area 161 are two atmospheres.

Figure 19:
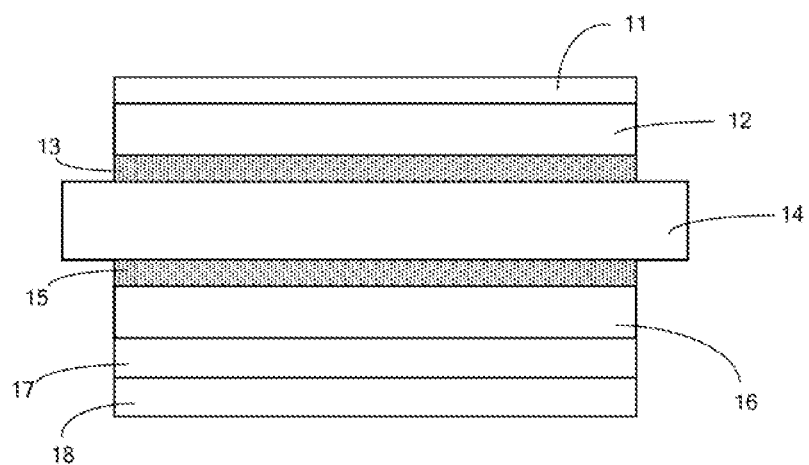

In block 202, referring to FIG. 19, a cover glass 11, an optical adjustment element 17, and a backlight module 18 are provided. The cover glass 11, the first polarizer 12, the adhesive layer 13, the liquid crystal display panel 14, the second adhesive layer 15, the second polarizer 16, the optical adjustment element 17 and the backlight module 18 are assembled to form a liquid crystal display 10. The present liquid crystal display 10 is thus obtained.

The embodiments shown and described above are only examples. Many details are often found in the art such as the other features of a touch device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A liquid crystal display comprising:
   a first polarizer defining a first direction and a second direction, the first direction being a direction of an absorption axis of the first polarizer, and the second direction is a direction towards to the geometric center of the first polarizer;
   the first polarizer further defining a first center area and a first peripheral area adjacent to the edges of the first polarizer and surrounding the first center area;
   the first peripheral area comprising a first sub-area, areas of the first peripheral area where the first direction is titled with the second direction are defined as the first sub-area;
   a second polarizer; and
   a liquid crystal cell disposed between the first polarizer and the second polarizer, the first polarizer being adhered to the liquid crystal cell;
   an adhesion intensity of the first polarizer and the liquid crystal cell corresponding to the first sub-area is greater than an adhesion intensity of the first polarizer and the liquid crystal cell corresponding to the first center area;
   wherein the liquid crystal display further comprises a first adhesive layer, the first polarizer is adhered with one side of the liquid crystal cell via the first adhesive layer, a distribution of colloidal particles of the first adhesive layer corresponding to the first sub-area is greater than a distribution of colloidal particles of the first adhesive layer corresponding to the first center area.

2. The liquid crystal display of claim 1, wherein the first peripheral area further comprises a second sub-area, areas of the first peripheral area where the first direction is parallel or substantially perpendicular to the second direction are defined as the second sub-area, an adhesion intensity of the first polarizer and the liquid crystal cell corresponding to the first sub-area is greater than an adhesion intensity of the first polarizer and the liquid crystal cell corresponding to the second sub-area.

3. The liquid crystal display of claim 2, wherein a distribution of colloidal particles of the first adhesive layer corresponding to the first sub-area is greater than a distribution of colloidal particles of the first adhesive layer corresponding to the second sub-area.

4. The liquid crystal display of claim 1, wherein the acreage of the first center area is equal to the acreage of the first peripheral area.

5. The liquid crystal display of claim 1, wherein the first adhesive layer comprises a number of pressure sensitive particles.

6. The liquid crystal display of claim 1, wherein the second polarizer defines a third direction and a fourth direction, the third direction is a direction of the absorption axis of the second polarizer, the fourth direction is a direction towards to the geometric center of the second polarizer, the second polarizer further defines a second center area and a second peripheral area adjacent to the edges of the second polarizer and surrounding the second center area, the second around area comprises a third sub-area, areas of the second peripheral area where the third direction is titled with the fourth direction are defined as the third sub-area, the second polarizer is adhered to the liquid crystal display panel, an adhesion intensity between the second polarizer and the liquid crystal cell corresponding to the third sub-area is greater than an adhesion intensity between the second polarizer and the liquid crystal cell corresponding to the second center area.

7. The liquid crystal display of claim 6, wherein the liquid crystal display further comprises a second adhesive layer, the second polarizer is adhered with another side of the liquid crystal cell via the second adhesive layer, a distribution of colloidal particles of the second adhesive layer corresponding to the third sub-area is greater than a distribution of colloidal particles of the second adhesive layer corresponding to the second center area.

8. The liquid crystal display of claim 7, wherein the second around area further comprises a fourth sub-area, areas of the second peripheral area where the third direction is parallel or substantially perpendicular to the fourth direction are defined as the fourth sub-area, an adhesion intensity of the second polarizer and the liquid crystal cell corresponding to the third sub-area is greater than an adhesion intensity of the second polarizer and the liquid crystal cell corresponding to the fourth sub-area.

9. The liquid crystal display of claim 8, wherein a distribution of colloidal particles of the second adhesive layer corresponding to the third sub-area is greater than a distribution of colloidal particles of the second adhesive layer corresponding to the fourth sub-area.

10. The liquid crystal display of claim 6, wherein the acreage of the second center area is equal to the acreage of the second peripheral area.

11. The liquid crystal display of claim 7, wherein the second adhesive layer comprises a number of pressure sensitive particles.

12. A method of manufacturing a liquid crystal display, comprising:
   an attachment processing of a polarizer to a liquid crystal cell, the polarizer defining a first direction and a second direction, the first direction is a direction of the absorption axis of the polarizer, the second direction is a direction towards to the geometric center of the polarizer, the first polarizer further defining a center area and a peripheral area adjacent to the edges of the polarizer and surrounding the center area, the peripheral area comprising a first sub-area, areas of the peripheral area where the first direction is titled with the second direction are defined as the first sub-area, comprising:
      pre-adhering the polarizer to the liquid crystal cell using an adhesive layer;

hot-pressing the liquid crystal cell having the polarizer,
wherein an adhesion intensity of colloidal particles of the adhesive layer corresponding to the first sub-area is greater than an adhesion intensity of colloidal particles of the adhesive layer corresponding to the center area,
wherein the adhesive layer is distributed between the polarizer and the liquid crystal cell, a distribution of colloidal particles of the adhesive layer corresponding to the first sub-area is greater than a distribution of colloidal particles of the adhesive layer corresponding to the center area.

13. The method of claim 12, wherein the adhesive layer is distributed between the polarizer and the liquid crystal cell uniformly, a pressure applied to the first sub-area is less than a pressure applied to the center area during the hot-pressing.

14. The method of claim 13, wherein the peripheral area further comprises a second sub-area, areas of the peripheral area where the first direction is parallel or substantially perpendicular to the second direction are defined as the second sub-area, an adhesion intensity of colloidal particles of the adhesive layer corresponding to the first sub-area is greater than an adhesion intensity of colloidal particles of the adhesive layer corresponding to the second sub-area.

15. The method of claim 14, wherein a pressure applied to the first sub-area is less than a pressure applied to the second sub-area during the hot-pressing.

16. The method of claim 15, wherein the operation temperature of the hot-pressing process maintains 50 degree centigrade, the duration of the autoclave process is about 30 minutes, the pressure applied to the first sub-area is less than two atmospheres, and the pressures applied to the second sub-area and the center area are greater than two atmospheres.

17. The method of claim 12, wherein the peripheral area further comprises a second sub-area, areas of the peripheral area where the first direction is parallel or substantially perpendicular to the second direction are defined as the second sub-area, a distribution of colloidal particles of the adhesive layer corresponding to the first sub-area is greater than a distribution of colloidal particles of the adhesive layer corresponding to the second sub-area.

18. The method of claim 17, wherein the operation temperature of the hot-pressing process maintains 50 degree centigrade, the duration of the autoclave process is about 30 minutes, the pressures applied to the first sub-area, the second sub-area and the center area are two atmospheres.

19. A liquid crystal display comprising:
a first polarizer defining a first direction and a second direction, the first direction being a direction of an absorption axis of the first polarizer, and the second direction is a direction towards to the geometric center of the first polarizer;
the first polarizer further defining a first center area and a first peripheral area adjacent to the edges of the first polarizer and surrounding the first center area;
the first peripheral area comprising a first sub-area, areas of the first peripheral area where the first direction is titled with the second direction are defined as the first sub-area;
a second polarizer; and
a liquid crystal cell disposed between the first polarizer and the second polarizer, the first polarizer being adhered to the liquid crystal cell;
an adhesion intensity of the first polarizer and the liquid crystal cell corresponding to the first sub-area is greater than an adhesion intensity of the first polarizer and the liquid crystal cell corresponding to the first center area;
wherein the acreage of the first center area is equal to the acreage of the first peripheral area.

* * * * *